United States Patent
Li et al.

(10) Patent No.: US 11,398,630 B2
(45) Date of Patent: Jul. 26, 2022

(54) METHOD OF GENERATING ENERGY FROM A HYDRAZIDE CONTAINING ANODE FUEL, AND FUEL CELL

(71) Applicant: IOWA STATE UNIVERSITY RESEARCH FOUNDATION, INC., Ames, IA (US)

(72) Inventors: Wenzhen Li, Ames, IA (US); Le Xin, Milwaukee, WI (US); Joseph Watkins, Ames, IA (US); Yang Qiu, Kennewick, WA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 216 days.

(21) Appl. No.: 16/811,975

(22) Filed: Mar. 6, 2020

(65) Prior Publication Data

US 2021/0005900 A1    Jan. 7, 2021

Related U.S. Application Data

(60) Provisional application No. 62/845,028, filed on May 8, 2019.

(51) Int. Cl.
*H01M 4/92* (2006.01)
*H01M 4/86* (2006.01)

(52) U.S. Cl.
CPC ......... *H01M 4/921* (2013.01); *H01M 4/8657* (2013.01); *H01M 4/926* (2013.01)

(58) Field of Classification Search
CPC ..... H01M 4/8657; H01M 4/921; H01M 4/926
(Continued)

(56) References Cited

U.S. PATENT DOCUMENTS 3,410,729 A    11/1968 Manion
8,475,968 B2    7/2013 Patolsky et al.
(Continued)

FOREIGN PATENT DOCUMENTS

JP      5828475 B2    12/2015
WO   2003056649 A1    7/2003

OTHER PUBLICATIONS

Serov et al. Direct hydrazine fuel cells: A review. Applied Catalysis B: Environmental, vol. 98, 2010, pp. 1-9. Retrieved from <URL: https://www.sciencedirect.com/science/article/pii/S0926337310001955> (Year: 2010).*
(Continued)

*Primary Examiner* — James M Erwin
(74) *Attorney, Agent, or Firm* — Troutman Pepper Hamilton Sanders LLP (Rochester)

(57) ABSTRACT

The present disclosure relates to a method of generating energy. This method involves providing a fuel cell comprising anode and cathode electrodes; a separator positioned between the anode and cathode electrodes; and anode and cathode catalysts. The anode catalyst comprises (i) a low-loading of platinum group metals (PGMs) supported on a Group 4-6 transition metal carbide (TMC) or nitride (TMN); (ii) an alloy or physical mixture comprising a Group 10 transition metal selected from Pt, Pd, and Ni and one or more of the following elements: Pt, Pd, Ni, Ir, Rh, Ru, Fe, Re, Sn, W, Mo, Ta, and Nb; or (iii) mixtures thereof. According to the method, a liquid anode fuel comprising one or more hydrazide compounds is added to the fuel cell to generate energy from the liquid anode fuel. Also disclosed is a fuel cell for generating energy from a liquid anode fuel comprising one or more hydrazide compounds.

20 Claims, 2 Drawing Sheets

(58) Field of Classification Search
USPC .......................................................... 429/524
See application file for complete search history.

(56) References Cited

U.S. PATENT DOCUMENTS

| | | | | |
|---|---|---|---|---|
| 9,601,784 | B1* | 3/2017 | Serov | ................... H01M 4/9083 |
| 9,786,943 | B2 | 10/2017 | Patolsky et al. | |
| 2008/0145733 | A1 | 6/2008 | Asazawa et al. | |
| 2011/0053022 | A1* | 3/2011 | Patolsky | ................. H01M 4/90 429/428 |
| 2012/0015281 | A1 | 1/2012 | Sakamoto et al. | |
| 2018/0185825 | A1* | 7/2018 | Liao | ......................... B01J 27/24 |

OTHER PUBLICATIONS

Asazawa et al., "Electrochemical Oxidation of Hydrazine and Its Derivatives on the Surface of Metal Electrodes in Alkaline Media," Journal of Power Sources 191:362-365 (2009).

Cao et al., "An Ni-P/C Electro-Catalyst With Improved Activity for the Carbohydrazide Oxidation Reaction," RSC Adv. 6:91956-91959 (2016).

Yamazaki et al., "Electrochemical Oxidation of Hydrazine Derivatives by Carbon-Supported Metalloporphyrins," Journal of Power Sources 204:79-84 (2012).

Qi et al., "Metal-Catalyst-Free Carbohydrazide Fuel Cells With Three-Dimensional Graphene Anodes," ChemSusChem 8:1147-1150 (2015).

Qi et al., "Carbon Nanotubes as Catalysts for Direct Carbohydrazide Fuel Cells," Carbon 89:142-147 (2015).

Qi et al., "Metal-Catalyst-Free Fuel Cells with Carbon as Catalysts," AIChE Meeting, Salt Lake City, UT (2015).

Li, "High Performance and Affordable Direct Carbohydrazide Fuel Cell (DCBFC)," I-Corps-RIF Presentation (Sep. 12, 2018).

* cited by examiner

H₂-AEMFC Schematic: *Journal of Power Sources, 375, 158-169*

METHOD OF GENERATING ENERGY FROM A HYDRAZIDE CONTAINING ANODE FUEL, AND FUEL CELL

This application claims benefit of U.S. Provisional Application Ser. No. 62/845,028, filed May 8, 2019, which is hereby incorporated by reference in its entirety.

This invention was made with government support under grant number CBET-1501124 awarded by National Science Foundation. The government has certain rights in the invention.

FIELD OF THE INVENTION

Disclosed herein is a fuel cell and a method of generating energy from a hydrazide compound containing anode fuel.

BACKGROUND OF THE INVENTION

The global mobile power source market was valued at around $2.26 billion in 2016 and it is expected to reach approximately $10.51 billion by 2024, with an estimated compound annual growth rate of >21.2% (2017 to 2024). Currently, batteries (particularly Li-batteries) dominate the mobile/portable power sources market for electric cars and portable electronics (smart phones, laptops, etc). However, all batteries need electric plugs to be charged and most common batteries cannot support a portable electronic device for more than 1 week without charging. Therefore, there are unique opportunities existing in the long-time continuous mobile power supply market. For example, supporting a laptop computer (50 W) for a month (4 weeks) in certain environments, where electric charging is not readily available and discontinuous operation is not allowed, would be a useful achievement in, e.g., defense markets, personal and other electronics, and some recreation mobile power sources.

Direct liquid fuel cells ("DLFCs") are an ideal electrochemical energy device to replace Li-batteries in such applications due to the higher energy density of liquid fuel, continuous quiet operation, and independence of charging plugs. Many liquid fuel cells have been proposed and developed, including lower alcohols, formic acid, dimethyl ether ("DME"), borohydride, ammonia, and hydrazine. Direct methanol fuel cells ("DMFCs") are one of the most studied liquid fuel cells and some commercial products are available on market.

Smart Fuel Cell (SFC-AG), a German company, has commercialized several product lines (e.g., EFOY, JENNY) that can meet certain military/defense market needs. For example, the EFOY Pro 800 can support a 25 W laptop to run 220 hours by using 5 liter (1.32 gallon) methanol solution fuel. However, DMFCs have a few key disadvantages: (1) very high noble metal loading used in both electrodes (e.g., >5.0 mg/cm' Pt and PtRu alloy for cathode and anode); (2) poor durability, because methanol is an organic solvent, which can degrade the interface between the polymer membrane (e.g., Nafion) and inorganic carbon microfiber-based catalyst layer; (3) low operation voltage of one DMFC is normally <0.55 V, due to low reversible potential (1.25 V, at standard conditions.); and (4) methanol crossover, which lowers fuel utilization and further reduces operation voltage.

In comparison, a direct formic acid fuel cell ("DFAFC"), direct borohydride fuel cell ("DBFC"), and direct hydrazine fuel cell ("DHFC"), each have high reversible potentials and can delivery higher output power density. DFAFC has a reversible potential of 1.48 V and output power density of >300 mW/cm$^2$, but needs heavy loading of Pt, Pd catalysts (e.g., >5.0 mg/cm$^2$). DBFC has a thermodynamic potential of 1.64 V and output power density of 250 mW/cm$^2$, but its main disadvantages are use of noble metal (e.g., Au) and carbohydrazide fuel is very expensive. In particular, hydrazine has received great attention due to its high cell voltage (standard, 1.56 V) and ease of oxidation with many non-platinum group metals ("PGM") catalysts. High cell performance can be achieved (e.g., 450 mW/cm$^2$ of peak power density). Although a Japanese automobile company (Daihatsu Motor Co. Ltd.) has been investigating hydrazine fuel cells for many years, the toxicity ($LD_{50}$, 60 mg/kg-rat) and the cost (~$2,500/ton) of hydrazine are severe concerns for large-scale commercial applications.

Direct carbohydrazide fuel cell research is motivated by its high theoretical potential (1.65 V), but until now the focus has been on metal-free catalysts using nanocarbon (e.g., carbon nanotubes, 2D graphene, and 3D graphene) as anode catalysts for carbohydrazide oxidation. Consequently, the open circuit voltage ("OCV") is quite low, e.g., <0.65 V (voltage efficiency is 40%, energy efficiency: <24%), and power density is <80 mW/cm$^2$ (Qi et al., "Metal-Catalyst-Free Carbohydrazide Fuel Cells with Three-Dimensional Graphene Anodes," *ChemSusChem* 8(7):1147-1150 (2015) and Qi et al., "Carbon Nanotubes as Catalysts for Direct Carbohydrazide Fuel Cells," *Carbon* 89:142-147 (2015)).

The present disclosure is directed to overcoming limitations in the art.

SUMMARY OF THE INVENTION

One aspect of the disclosure relates to a method of generating energy. This method involves providing a fuel cell comprising anode and cathode electrodes, a separator positioned between the anode and cathode electrodes, and anode and cathode catalysts, where the anode catalyst comprises (i) a low-loading of platinum group metals (PGMs) supported on a Group 4-6 transition metal carbide ("TMC") or transition metal nitride ("TMN"); (ii) an alloy or physical mixture comprising a Group 10 transition metal selected from Pt, Pd, and Ni and one or more of the following elements: Pt, Pd, Ni, Ir, Rh, Ru, Fe, Re, Sn, W, Mo, Ta, and Nb; or (iii) mixtures thereof. According to the method, a liquid anode fuel comprising one or more hydrazide compounds is added to the fuel cell to generate energy from the liquid anode fuel.

Another aspect of the disclosure relates to a fuel cell comprising an anode electrode; a cathode electrode; a separator positioned between the anode electrode and the cathode electrode; an anode catalyst, where the anode catalyst comprises (i) a low-loading of platinum group metals (PGMs) supported on a Group 4-6 transition metal carbide (TMC) or nitride (TMN); (ii) an alloy or physical mixture comprising a Group 10 transition metal selected from Pt, Pd, and Ni and one or more of the following elements: Pt, Pd, Ni, Ir, Rh, Ru, Fe, Re, Sn, W, Mo, Ta, and Nb; or (iii) mixtures thereof and a cathode catalyst.

A further aspect of the disclosure is a fuel cell for generating energy from a liquid anode fuel comprising one or more hydrazide compounds. The fuel cell comprises anode and cathode electrodes; a separator positioned between the anode and cathode electrodes; anode and cathode catalysts, where the anode catalyst comprises (i) a low-loading of platinum group metals (PGMs) supported on a Group 4-6 transition metal carbide (TMC) or nitride (TMN); (ii) an alloy or physical mixture comprising a Group 10 transition metal selected from Pt, Pd, and Ni and one or more of the following elements: Pt, Pd, Ni, Ir, Rh, Ru, Fe, Re, Sn, W, Mo, Ta, and Nb; or (iii) mixtures thereof; and an anode fuel comprising one or more hydrazide compounds.

Described herein is a novel liquid fuel cell that is directly fed with a hydrazide compound, e.g., carbohydrazide. Compared with hydrazine, carbohydrazide is nontoxic ($LD_{50}$, >5,000 mg/kg-rat) and inexpensive (~$1,000/ton), quite similar to ethanol. Carbohydrazide is a commodity chemical, and can be synthesized from hydrazine and urea. As a nontoxic, strong reducing agent, carbohydrazide has been broadly used as an oxygen scrubber for industrial boilers, a chemical precursor for polymer synthesis, and a soap stabilizer.

Disclosed herein is a new type of inexpensive, high performance alkaline membrane fuel cell for portable/mobile power source applications, in particular, for military and law-enforcement vehicles, for electronic equipment for army soldiers, night vision goggles, computers, communications, GPS, sensors, and underwater unmanned vehicles. The fuel cell uses a liquid hydrazide compound solution as fuel with high energy density to replace hydrogen gas and other liquid (e.g., toxic hydrazine or low operation potential methanol) fuels. The direct hydrazide compound fuel cell does not need a costly proton-exchange membrane (e.g., Nafion), and can output high electrical power density (>500 $mW/cm^2$) and operate at high voltage with high efficiency (100 $mA/cm^2$ @1 V, 60% efficiency). Its theoretical potential is 1.65 V, which is greater than most other liquid fuels, such as formic acid (1.48 V), hydrazine (1.56 V), and borohydride (1.64 V) for fuel cell applications.

The fuel cell and energy generating method described herein may work at 1.0 V, 100 $mA/cm^2$ (100 $mW/cm^2$) at an energy efficiency of >61%, which can reduce half of the cell number of the stack (e.g., 0.5 V, 200 $mA/cm^2$) of a commercial direct methanol fuel cell (e.g., from Smart Fuel Cell AG, a successful product on the mobile power source market), while significantly reducing catalyst (from noble metal Pt, Pd to transition metal Co, Fe-based) and membrane (from proton exchange membrane to anion exchange membrane) costs.

DETAILED DESCRIPTION OF THE INVENTION

One aspect of the disclosure relates to a method of generating energy. This method involves providing a fuel cell comprising anode and cathode electrodes, a separator positioned between the anode and cathode electrodes, and anode and cathode catalysts, where the anode catalyst comprises (i) a low-loading of platinum group metals (PGMs) supported on a Group 4-6 transition metal carbide (TMC) or nitride (TMN); (ii) an alloy or physical mixture comprising a Group 10 transition metal selected from Pt, Pd, and Ni and one or more of the following elements: Pt, Pd, Ni, Ir, Rh, Ru, Fe, Re, Sn, W, Mo, Ta, and Nb; or (iii) mixtures thereof. According to the method, a liquid anode fuel comprising one or more hydrazide compounds is added to the fuel cell to generate energy from the liquid anode fuel.

Another aspect of the disclosure relates to a fuel cell comprising an anode electrode; a cathode electrode; a separator positioned between the anode electrode and the cathode electrode; an anode catalyst, where the anode catalyst comprises (i) a low-loading of platinum group metals (PGMs) supported on a Group 4-6 transition metal carbide (TMC) or nitride (TMN); (ii) an alloy or physical mixture comprising a Group 10 transition metal selected from Pt, Pd, and Ni and one or more of the following elements: Pt, Pd, Ni, Ir, Rh, Ru, Fe, Re, Sn, W, Mo, Ta, and Nb; or (iii) mixtures thereof; and a cathode catalyst.

A further aspect of the disclosure is a fuel cell for generating energy from a liquid anode fuel comprising one or more hydrazide compounds. The fuel cell comprises anode and cathode electrodes; a separator positioned between the anode and cathode electrodes; anode and cathode catalysts, where the anode catalyst comprises (i) a low-loading of platinum group metals (PGMs) supported on a Group 4-6 transition metal carbide (TMC) or nitride (TMN); (ii) an alloy or physical mixture comprising a Group 10 transition metal selected from Pt, Pd, and Ni and one or more of the following elements: Pt, Pd, Ni, Ir, Rh, Ru, Fe, Re, Sn, W, Mo, Ta, and Nb; or (iii) mixtures thereof; and an anode fuel comprising one or more hydrazide compounds.

A fuel cell is an electrochemical device in which electrical energy is generated by a chemical reaction without altering the basic components of the fuel cell, i.e., the electrodes and the electrolyte. Fuel cells combine small organic compounds and oxygen without combustion to form water, and also produce direct current electric power. The process can be described as electrolysis in reverse. The fuel cell is unique in that it converts chemical energy continuously into electrical energy without an intermediate conversion to heat energy.

Figure 1:
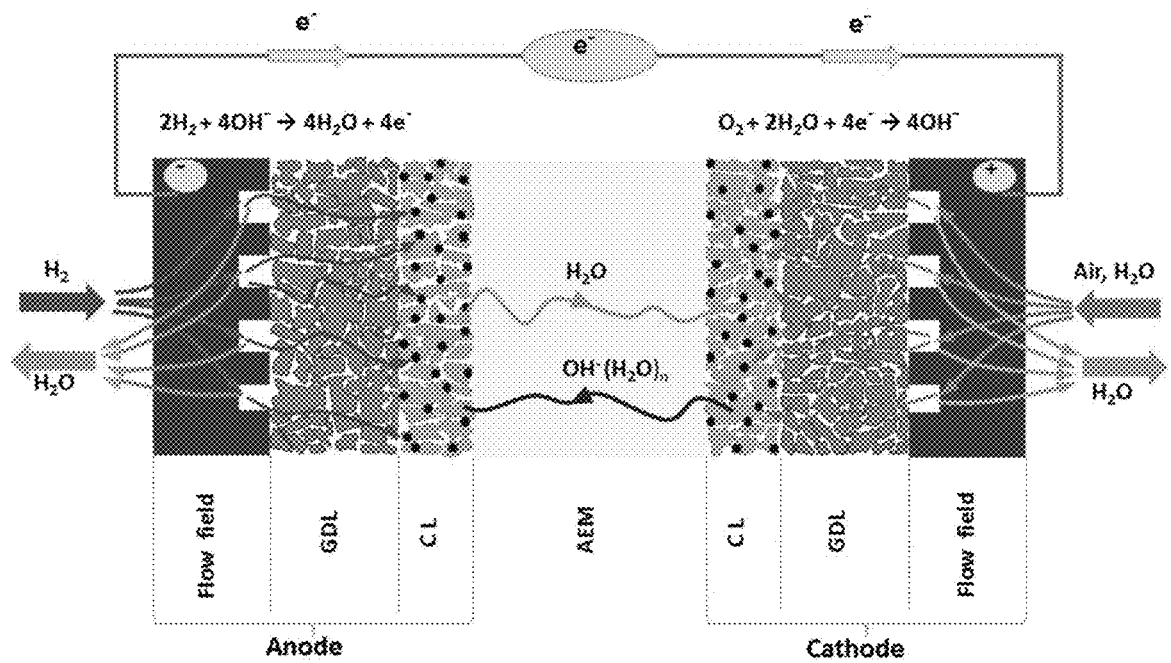
FIG. 1 is a schematic illustration of one embodiment of a direct liquid anion exchange membrane fuel cell.

As used herein, the term "fuel cell" refers to a device used for the generation of electricity from a chemical reaction. The reaction can proceed naturally or can be facilitated with electrical input from, for example, a potentiostat. The fuel cell is comprised of anode and cathode electrodes connected through a conductive material. The electrodes may be housed in a single or double chamber and are separated by a separator positioned between the anode and cathode electrodes. FIG. 1 provides a schematic illustration of one embodiment of a direct liquid anion exchange membrane fuel cell.

The working principles of the energy-generating method and fuel cell device described herein are shown in Scheme 1, infra, and electrode reactions as well as standard potentials of DCBFC are also shown infra. The standard cell voltage of a DCFC is 1.65 V, slightly higher than that of a direct hydrazine fuel cell. Similar to hydrazide, alkaline media is also preferred for the oxidation of carbohydrazide, and thus non-PGM catalysts can potentially be used for carbohydrazide as well. Because it has a lower chemical toxicity, reduced fuel cost, and increased cell voltage, carbohydrazide represents a suitable alternative to hydrazine for a liquid fuel cell.

Scheme 1: Reactions and Reversible Potentials
at the Anode and Cathode of a DCBFC

| | | |
|---|---|---|
| Anode | $CH_6N_4O + 8OH^- = CO_2 + 7H_2O + 2N_2 + 8e^-$ | −0.42 V vs. RHE |
| Cathode | $2O_2 + 4H_2O + 8e^- = 8OH^-$ | +1.23 V vs. RHE |
| Overall | $CH_6N_4O + 2O_2 = CO_2 + 3H_2O + 2N_2$ | +1.65 V |

RHE: reversible hydrogen electrode.

Compared with hydrazine, which has a simple chemical structure, the oxidation of carbohydrazide is reasonably more sluggish (though it is still much more facile than those of many other liquid fuels such as methanol and ethanol). For example, it has been reported that monometallic catalysts often require a large overpotential to oxidize carbohydrazide. In particular, Pt is the most active metal, which demands ~600 mV of overpotential to deliver a meaningful oxidizing current. As a result, the cell performance of a carbohydrazide fuel cell with Pt as anode catalyst is limited: 492.5 mW/cm$^2$ of peak power density (80° C., 2.0 M carbohydrazide in 6.0 M KOH as fuel, alkaline-membrane electrolyte, and ambient-pressure oxygen as oxidant).

In one embodiment, the fuel cell is adapted to receive a liquid anode fuel comprising one or more hydrazide compounds. In various embodiments, a fuel cell adapted to receive a liquid anode fuel comprising one or more hydrazide compounds has specific catalysts and/or a separator specifically suited to a hydrazide compound containing anode fuel.

In one embodiment, the separator is an anion exchange membrane. An anion exchange membrane is a semipermeable membrane generally made from ionomers and designed to conduct anions while being impermeable to gases such as oxygen or hydrogen. Anion exchange membranes are used in electrolytic cells and fuel cells to separate reactants present around the two electrodes while transporting the anions essential for the cell operation. One example of an anion exchange membrane is the hydroxide anion exchange membrane used to separate the electrodes of a direct methanol fuel cell (DMFC) or direct-ethanol fuel cell (DEFC).

The electrodes (anode and/or cathode) may include a microporous layer configured to increase reactant diffusion effects. The microporous layer generally includes conductive powders with a particular particle diameter, for example a carbon powder, carbon black, acetylene black, activated carbon, a carbon fiber, fullerene, carbon nanotube, carbon nano wire, a carbon nano-horn, carbon nano ring, or a combination thereof. The microporous layer may be formed by coating a composition including a conductive powder, a binder resin, and a solvent on the electrode substrate. The binder resin may include, for example and without limitation, polytetrafluoroethylene, polyvinylidenefluoride, polyhexafluoropropylene, polyperfluoroalkylvinylether, polyperfluorosulfonylfluoride, alkoxyvinyl ether, polyvinylalcohol, celluloseacetate, a copolymer thereof, or the like. The solvent may include alcohols such as ethanol, isopropyl alcohol, n-propylalcohol, and butanol, water, dimethyl acetamide, dimethylsulfoxide, N-methylpyrrolidone, tetrahydrofuran, or the like. The coating method may include, but is not limited to, screen printing, spray coating, doctor blade methods, gravure coating, dip coating, silk screening, painting, direct writing (e.g., as an ink) and so on, depending on the viscosity of the composition.

The anode catalyst is, according to one embodiment, (i) a low-loading of platinum group metals (PGMs) supported on a Group 4-6 transition metal carbide (TMC) or nitride (TMN); (ii) an alloy or physical mixture comprising a Group 10 transition metal selected from Pt, Pd, and Ni and one or more of the following elements: Pt, Pd, Ni, Ir, Rh, Ru, Fe, Re, Sn, W, Mo, Ta, and Nb; or (iii) mixtures thereof.

In one embodiment, the anode catalyst is a low-loading of platinum group metals (PGMs) supported on a Group 4-6 transition metal carbide (TMC) or nitride (TMN).

In another embodiment, the anode catalyst is an alloy or physical mixture comprising a Group 10 transition metal selected from Pt, Pd, and Ni and one or more of the following elements: Pt, Pd, Ni, Ir, Rh, Ru, Fe, Re, Sn, W, Mo, Ta, and Nb.

In a further embodiment, the anode catalyst is a mixture of (i) a low-loading of platinum group metals (PGMs) supported on a Group 4-6 transition metal carbide (TMC) or nitride (TMN) and (ii) an alloy or physical mixture comprising a Group 10 transition metal selected from Pt, Pd, and Ni and one or more of the following elements: Pt, Pd, Ni, Ir, Rh, Ru, Fe, Re, Sn, W, Mo, Ta, and Nb.

As used herein, the term "platinum group metal" refers any one of the following elements: Pt, Pd, Ir, Rh, Os, and Ru.

As used herein, "Group 4-6 transition metal carbide" and "Group 4-6 transition metal nitride" includes all transition metal carbides and nitrides where the parent metal is selected from Group 4-6 of the periodic table. For example, such parent metals include W, Mo, Cr, Ta, Nb, V, Hf, Zr, and Ti.

Anode metal catalysts suitable in the method described herein include, without limitation, bimetallics and ternary (and beyond) catalysts. Suitable examples of anode metal catalysts include, without limitation, alloys or physical mixtures of platinum and ruthenium (Pt—Ru), palladium and nickel (Pd—Ni), and palladium, rhodium, and tin oxide (Pd—Rh—SnO$_2$).

In one embodiment, the anode metal catalyst is the bimetallic catalyst Pt—Ru. As described herein in the examples, PtRu black constitutes an improved catalyst.

In one embodiment, the anode catalyst comprises a metal loading of less than about 20 mg/cm$^2$, less than about 15 mg/cm$^2$, less than about 10 mg/cm$^2$, less than about 9 mg/cm$^2$, less than about 8 mg/cm$^2$, less than about 7 mg/cm$^2$, less than about 6 mg/cm$^2$, less than about 5 mg/cm$^2$, less than about 4 mg/cm$^2$, less than about 3 mg/cm$^2$, less than about 2 mg/cm$^2$, or less than about 1 mg/cm$^2$.

In one embodiment, the anode catalyst comprises a metal loading of about 0.1 to about 3.0 mg/cm$^2$, or a metal loading of 0.1 to 3.0 mg/cm$^2$, 0.1 to 2.9 mg/cm$^2$, 0.1 to 2.8 mg/cm$^2$, 0.1 to 2.7 mg/cm$^2$, 0.1 to 2.6 mg/cm$^2$, 0.1 to 2.5 mg/cm$^2$, 0.1 to 2.4 mg/cm$^2$, 0.1 to 2.3 mg/cm$^2$, 0.1 to 2.2 mg/cm$^2$, 0.1 to 2.1 mg/cm$^2$, 0.1 to 2.0 mg/cm$^2$, 0.1 to 1.9 mg/cm$^2$, 0.1 to 1.8 mg/cm$^2$, 0.1 to 1.7 mg/cm$^2$, 0.1 to 1.6 mg/cm$^2$, 0.1 to 1.5 mg/cm$^2$, 0.1 to 1.4 mg/cm$^2$, 0.1 to 1.3 mg/cm$^2$, 0.1 to 1.2 mg/cm$^2$, 0.1 to 1.1 mg/cm$^2$, 0.1 to 1.0 mg/cm$^2$, 0.1 to 0.9 mg/cm$^2$, 0.1 to 0.8 mg/cm$^2$, 0.1 to 0.7 mg/cm$^2$, 0.1 to 0.6 mg/cm$^2$, 0.1 to 0.5 mg/cm$^2$, 0.1 to 0.4 mg/cm$^2$, 0.1 to 0.3 mg/cm$^2$, or 0.1 to 0.2 mg/cm$^2$, 0.2 to 3.0 mg/cm$^2$, 0.3 to 3.0 mg/cm$^2$, 0.4 to 3.0 mg/cm$^2$, 0.5 to 3.0 mg/cm$^2$, 0.6 to 3.0 mg/cm$^2$, 0.7 to 3.0 mg/cm$^2$, 0.8 to 3.0 mg/cm$^2$, 0.9 to 3.0 mg/cm$^2$, 1.0 to 3.0 mg/cm$^2$, 1.1 to 3.0 mg/cm$^2$, 1.2 to 3.0 mg/cm$^2$, 1.3 to 3.0 mg/cm$^2$, 1.4 to 3.0 mg/cm$^2$, 1.5 to 3.0 mg/cm$^2$, 1.6 to 3.0 mg/cm$^2$, 1.7 to 3.0 mg/cm$^2$, 1.8 to 3.0 mg/cm$^2$, 1.9 to 3.0 mg/cm$^2$, 2.0 to 3.0 mg/cm$^2$, 2.1 to 3.0 mg/cm$^2$, 2.2 to 3.0 mg/cm$^2$, 2.3 to 3.0 mg/cm$^2$, 2.4 to 3.0 mg/cm$^2$, 2.5 to 3.0 mg/cm$^2$, 2.6 to 3.0 mg/cm$^2$, 2.7 to 3.0 mg/cm$^2$, 2.8 to 3.0 mg/cm$^2$, or 2.9 to 3.0 mg/cm$^2$.

Anode catalysts may be comprised of a single layer or more than one layer. In one embodiment the anode catalyst comprises a single layer. In another embodiment, the anode catalyst comprises two or more layers. When the anode catalyst comprises more than one layer, a first layer is proximate the separator and subsequent layers are proximate the liquid anode fuel added to the fuel cell. For example, in one embodiment, the anode catalyst comprises a first layer proximate the separator and a second layer proximate the liquid anode fuel added to the fuel cell.

In one embodiment, the first layer comprises Pt or, in another embodiment, the first layer contains only a single catalyst and that catalyst is Pt. In a more specific embodiment, the first layer comprises a Pt loading of about 0.1 to 2.0 mg/cm$^2$.

In one embodiment, the second layer comprises PtRu or, in another embodiment, the second layer contains only a single catalyst and that catalyst is PtRu. In a more specific embodiment, the second layer comprises a PtRu metal loading of about 0.1 to 3.0 mg/cm$^2$.

In one embodiment, the anode catalyst comprises two layers, including a first layer comprising Pt and a second layer comprising PtRu. According to this embodiment, and without being bound by theory, it is believed that PtRu is involved in carbohydrazide decomposition to H$_2$ or direct oxidation of carbobydrazide (to release electrons), and that Pt is a superior catalyst for H$_2$ oxidation (even better than PtRu).

In one embodiment, the anode catalyst comprises two layers, including a first layer comprising a Pt loading of about 0.1 to 2.0 mg/cm$^2$ and a second layer comprising a PtRu metal loading of about 0.1 to 3.0 mg/cm$^2$.

In one embodiment, the cathode catalyst is selected from a low-loading metal, a metal-free catalyst, doped carbon material, noble metal, non-noble metal, or mixtures thereof.

In one embodiment, the cathode catalyst is a low-loading precious metal. For example, and without limitation, the cathode catalyst may be selected from a noble metal alloy; dealloyed Pt—M, where M is a transition metal; nanoparticles supported on carbon nanotubes or carbon black; noble metal or a mixture of noble metals supported on carbon nanotubes or carbon black; or mixtures thereof.

In another embodiment, the cathode catalyst is a metal-free catalyst. For example, and without limitation, the cathode catalyst may comprise a doped carbon material or is made of a doped carbon material. In one embodiment, the doped carbon material is a heteroatom doped carbon material cathodic catalyst, which can significantly decrease costs compared to noble metal cathodic catalysts. The heteroatom may include N, S, P, B, or Cl. N and S are used herein as doped elements, because carbon materials with such dual doped elements exhibit impressive oxygen reduction reaction performance without any poisoning effect at the cathodic side during reaction. According to another embodiment, the doped carbon material is selected from mesoporous carbon, carbon nanotubes, and graphene, and the carbon material is doped with nitrogen or is duel-doped with nitrogen and sulfur or nitrogen and phosphorous.

In another embodiment, the cathode catalyst is a noble metal. The term "noble metal" refers to metals that are resistant to corrosion and oxidation in moist air. For example, noble metals include ruthenium, rhodium, palladium, silver, osmium, iridium, platinum, gold, mercury, rhenium, and copper.

In another embodiment, the cathode catalyst is a non-precious metal catalyst. For example, and without limitation, the cathode catalyst may comprise Fe, Co, Ni, Cu, and mixtures thereof, or is made of Fe, Co, Ni, Cu, or mixtures thereof.

In yet another embodiment, the cathode catalyst comprises Pt/C, Pd/C, Ag/C, or Fe—N/C.

In the method disclosed herein, a liquid anode fuel comprising one or more hydrazide compounds is added to the fuel cell to generate energy from the liquid anode fuel.

In one embodiment, the anode fuel is selected from formic hydrazide, carbohydrazide, 1,2-diformylhydrazine, acethydrazide, methyl hydrazinocarboxylate, oxalyldihydrazide, cyanoacetohydrazide, propanoic acid hydrazide, 1,2-diacetylhydrazine, succinic dihydrazide, ethyl 3-hydrazino-3-oxopropionate, adipic acid dihydrazide, 3-bromobenzoic hydrazide, 4-bromobenzoic hydrazide, 2-chlorobenzoic hydrazide, 4-chlorobenzhydrazide, 2-fluorobenzoic hydrazide, 3-fluorobenzoic hydrazide, 4-fluorobenzoic hydrazide, 4-nitrobenzoic hydrazide, benzhydrazide, 3-hydroxybenzoic hydrazide, 2,4-dihydroxybenzoic acid hydrazide, 2-aminobenzhydrazide, 4-aminobenzoic hydrazide, 3,4-diaminobenzhydrazide, 3-nitrophthalhydrazide, N-aminophthalimide, phthalhydrazide, 4-(trifluoromethyl)benzhydrazide, 4-fluorophenoxyacetic acid hydrazide, 3-methyl-4-nitrobenzhydrazide, p-toluic hydrazide, phenylacetic hydrazide, 4-methoxybenzhydrazide, m-anisic hydrazide, octanoic hydrazide, 4-methoxybenzyl carbazate, di-tert-butyl hydrazodiformate, 3-hydroxy-2-naphthoic hydrazide, 4-tert-butylbenzoic hydrazide, 1,5-diphenylcarbazide, 1,5-diphenylcarbazide, and mixtures thereof.

In a specific embodiment, the anode fuel is carbohydrazide.

In yet another embodiment, the anode fuel comprises hydrazides or a mixture of hydrazides with sodium borohydride or hydrazine hydrate.

In one embodiment, the method further involves adding a cathode fuel to the fuel cell.

In one embodiment, the cathode fuel is selected from humidified oxygen, humidified air, or a mixture thereof.

In another embodiment, one or more hydrazide compounds are present in the anode fuel at a concentration of about 0.1 M to about 20 M, about 0.1 M to about 10 M, about 0.1 M to about 9 M, about 0.1 M to about 8 M, about 0.1 M to about 7 M, about 0.1 M to about 6 M, about 0.1 M to about 5 M, about 0.1 M to about 4 M, about 0.1 M to about 3 M, about 0.1 M to about 2 M, or about 0.1 M to about 1 M.

In yet another embodiment, one or more hydrazide compounds are present in the anode fuel at a concentration of about 0.01 M to about 10 M, about 0.1 M to about 10 M, about 0.5 M to about 10 M, about 1 M to about 10 M, about 2 M to about 10 M, about 3 M to about 10 M, about 4 M to about 10 M, about 5 M to about 10 M, about 6 M to about 10 M, about 7 M to about 10 M, about 8 M to about 10 M, or about 9 M to about 10 M.

In a further embodiment, the anode fuel further comprises a base.

Suitable bases include, but are not limited to lithium hydroxide, potassium hydroxide, sodium hydroxide, and the like. In one embodiment, the base is potassium hydroxide or sodium hydroxide.

In one embodiment, the base is present in the anode fuel at a concentration of about 0.01 M to about 10 M, about 0.1 M to about 10 M, about 0.5 M to about 10 M, about 1 M to about 10 M, about 2 M to about 10 M, about 3 M to about 10 M, about 4 M to about 10 M, about 5 M to about 10 M, about 6 M to about 10 M, about 7 M to about 10 M, about 8 M to about 10 M, or about 9 M to about 10 M.

In another embodiment, the base is present in the anode fuel at a concentration of about 0.1 M to about 20 M, 0.1 M to about 10 M, about 0.1 M to about 9 M, about 0.1 M to about 8 M, about 0.1 M to about 7 M, about 0.1 M to about 6 M, about 0.1 M to about 5 M, about 0.1 M to about 4 M, about 0.1 M to about 3 M, about 0.1 M to about 2 M, or about 0.1 M to about 1 M.

In at least one embodiment, the anode fuel is purged with an inert gas. Suitable inert gases include, but are not limited to, nitrogen and argon.

In one embodiment, the anode electrode comprises an acid treated hydrophilic carbon cloth.

In one embodiment, the cathode electrode comprises a carbon paper.

In one embodiment, the carbon paper is subjected to a hydrophobic treatment.

In yet another embodiment, the carbon paper comprises polytetrafluoroethylene ("PTFE") of about 0.1 wt % to about 30 wt %, about 1 wt % to about 30 wt %, about 2 wt % to about 30 wt %, about 3 wt % to about 30 wt %, about 4 wt % to about 30 wt %, about 5 wt % to about 30 wt %, about 6 wt % to about 30 wt %, about 7 wt % to about 30 wt %, about 8 wt % to about 30 wt %, about 9 wt % to about 30 wt %, about 10 wt % to about 30 wt %, about 11 wt % to about 30 wt %, about 12 wt % to about 30 wt %, about 13 wt % to about 30 wt %, about 14 wt % to about 30 wt %, about 15 wt % to about 30 wt %, about 16 wt % to about 30 wt %, about 17 wt % to about 30 wt %, about 18 wt % to about 30 wt %, about 19 wt % to about 30 wt %, about 20 wt % to about 30 wt %, about 21 wt % to about 30 wt %, about 22 wt % to about 30 wt %, about 23 wt % to about 30 wt %, about 24 wt % to about 30 wt %, about 25 wt % to about 30 wt %, about 26 wt % to about 30 wt %, about 27 wt % to about 30 wt %, about 28 wt % to about 30 wt %, or about 29 wt % to about 30 wt %.

In a further embodiment, the carbon paper comprises PTFE of about 1 wt % to about 5 wt %, about 1 wt % to about 10 wt %, 1 wt % to about 15 wt %, about 1 wt % to about 20 wt %, 1 wt % to about 25 wt %, or about 1 wt % to about 30 wt %.

In yet another embodiment, the cathode electrode comprises an anion exchange ionomer AS-4, tris(2,4,6-trimethoxyphenyl)polysulfone-methylene quaternary phosphonium-hydroxide ("TPQPOH"), cation exchange ionomer (Nafion), or polytetrafluoroethylene (PTFE).

In a further embodiment, the anion exchange ionomer AS-4 TPQPOH, cation exchange ionomer (Nafion), or PTFE is present in the cathode catalyst at an amount of about 5 wt % to about 50 wt %, about 10 wt % to about 50 wt %, 15 wt % to about 50 wt %, about 20 wt % to about 50 wt %, about 25 wt % to about 50 wt %, about 30 wt % to about 50 wt %, about 35 wt % to about 50 wt %, about 40 wt % to about 50 wt %, or about 45 wt % to about 50 wt %.

In yet another embodiment, the anion exchange ionomer AS-4 TPQPOH, cation exchange ionomer (Nafion), or PTFE is present in the cathode catalyst at an amount of about 5 wt % to about 50 wt %, about 5 wt % to about 45 wt %, about 5 wt % to about 40 wt %, about 5 wt % to about 35 wt %, about 5 wt % to about 30 wt %, about 5 wt % to about 25 wt %, about 5 wt % to about 20 wt %, about 5 wt % to about 15 wt %, or about 5 wt % to about 10 wt %.

In another embodiment, the fuel cell is at a temperature of above 25° C. at the time of said adding. For example, the fuel cell is at a temperature of about 25° C. to about 100° C., about 30° C. to about 95° C., about 35° C. to about 90° C., about 40° C. to about 90° C., about 45° C. to about 90° C., about 50° C. to about 90° C., about 55° C. to about 90° C., about 55° C. to about 85° C., or about 60° C. to about 80° C.

In another embodiment, the anode fuel is added to the fuel cell at a flow rate of about 20 mL min$^{-1}$ to about 1 L min$^{-1}$, about 15 mL min$^{-1}$ to about 1 L min$^{-1}$, about 10 mL min$^{-1}$ to about 1 L min$^{-1}$, about 9 mL min$^{-1}$ to about 1 L min$^{-1}$, about 8 mL min$^{-1}$ to about 1 L min$^{-1}$, about 7 mL min$^{-1}$ to about 1 L min$^{-1}$, about 6 mL min$^{-1}$ to about 1 L min$^{-1}$, about 5 mL min$^{-1}$ to about 1 L min$^{-1}$, about 4 mL min$^{-1}$ to about 1 L min$^{-1}$, about 3 mL min$^{-1}$ to about 1 L min$^{-1}$, or about 2 mL min$^{-1}$ to about 1 L min$^{-1}$.

In one embodiment, the anode fuel is preheated before the addition to the fuel cell. For example, the anode fuel may be preheated to 40° C. to 100° C., 45° C. to 95° C., 50° C. to 90° C., 55° C. to 85° C., 56° C. to 84° C., 57° C. to 83° C., 58° C. to 82° C., 59° C. to 81° C., or 60° C. to 80° C.

In another embodiment, the anode fuel is preheated to 60° C. to 80° C. before being added to the fuel cell.

In carrying out the method described herein, or using the fuel cell described herein, one can achieve a peak power density for DLFC of at least about 490 mW cm$^{-2}$, or 500 mW cm$^{-2}$, 525 mW cm$^{-2}$, 550 mW cm$^{-2}$, 575 mW cm$^{-2}$, 600 mW cm$^{-2}$, 625 mW cm$^{-2}$, 650 mW cm$^{-2}$, 675 mW cm$^{-2}$, 700 mW cm$^{-2}$, 725 mW cm$^{-2}$, 750 mW cm$^{-2}$, 775 mW cm$^{-2}$, 800 mW cm$^{-2}$, 825 mW cm$^{-2}$, 850 mW cm$^{-2}$, 855 mW cm$^{-2}$, 860 mW cm$^{-2}$, 865 mW cm$^{-2}$, 870 mW cm$^{-2}$, 875 mW cm$^{-2}$, 880 mW cm$^{-2}$, 885 mW cm$^{-2}$, 890 mW cm$^{-2}$, 895 mW cm$^{-2}$, or 900 mW cm$^{-2}$.

EXAMPLES

Example 1—High Performance Direct Carbohydrazide Fuel Cells (DCBFCs) Experimental Section

Chemicals and Materials

Pt black, Pt/C-40 wt %, PtRu black, and PtRu/C-40 wt % were purchased from Premetek Co. AS-4 ionomer and A201 (28 µm) were obtained from Tokuyama Inc, Japan. Acid-treated carbon cloth (MPL-W1S1009 or ELAT LT1400) and carbon paper (TGP-H-60) were ordered from fuelcellstore.com. CBHZ was purchased from TCI chemicals, while all other chemicals, such as PTFE and KOH, were bought from Sigma-Aldrich. All chemicals were used without further purification/treatment.

Electrode and Membrane Electrode Assembly (MEA) Fabrications

The MEA was assembled with an anode (with a Pt/C 40 wt %, Pt black, PtRu/C 40 wt % or PtRu black catalyst), an anion exchange membrane (AEM, Tokuyama A201, 28 µm) and a cathode (with a Pt/C or Pt black catalyst).

To prepare the anode, catalyst ink containing 80 wt % of the purchased anode catalyst and 20 wt % of Teflon was sprayed on a carbon cloth (acid-treated) as an anode diffusion layer to obtain a catalyst loading of 1.5 mg$_{Pt}$ cm$^{-2}$ or 2.25 mg$_{PtRu}$ cm$^{-2}$ (1.5 mg$_{Pt}$ cm$^{-2}$+0.75 mg$_{Ru}$ cm$^{-2}$). On the cathode, a commercial Pt/C-40 wt % or Pt black catalyst was blended with AS-4 anion conductive ionomer (Tokuyama) with a ratio of 80 wt % to 20 wt %, and sprayed directly onto the A201 membrane (4 cm×4 cm) to obtain a catalyst loading of 1.0 mg$_{Pt}$ cm$^{-2}$, and was covered with a carbon paper (TGP-H-60) gas diffusion layer. The evenly-sprayed carbon cloth anode and catalyst coated membrane (CCM) cathode were dried in air under room temperature overnight before use. The MEA was mounted with 70 lb in stacking by directly assembling the anode, cathode, and carbon paper in sequence without hot press. 0005 inch PTFE film gaskets were used for both anode and cathode.

Single Fuel Cell Tests

The MEA was mounted in a fuel cell with an active cross-sectional area of 5 cm$^2$, and tested by a Scribner-Associates 850e fuel cell test station at Li Lab. A fuel cell fixture with an active area of 5 cm$^2$ was purchased from Fuel Cell Technology Inc. and was used for DCBFC performance tests. The anode end plate was made of stainless steel (316 L) so as to tolerate the alkaline environment.

A fuel of 6.0 M CB in 2.0 M KOH was fed into the anode compartment at 10 mL min$^{-1}$. High purity O$_2$ (99.999%) regulated at 1.0 L min$^{-1}$ was fed into the cathode compartment with 100% relative humidity (RH) under a back pressure of 30 psi. The fuel cell performances were tested at 80° C. with cathode humidification at 80° C. The carbohydrazide solution was pre-heated at 80° C. with Ar purging at 2 mL min$^{-1}$, and directly fed to the anode chamber of the fuel cell fixture. The MEA was directly tested without any pre-activation steps (such as voltage cycle). The polarization curves of the DCBFCs were obtained by scanning current and collecting the respective voltage and power density. The I-V curves were collected using the Scribner FuelCell® software and plotted by Origin.

Results and Discussion

Figure 2:
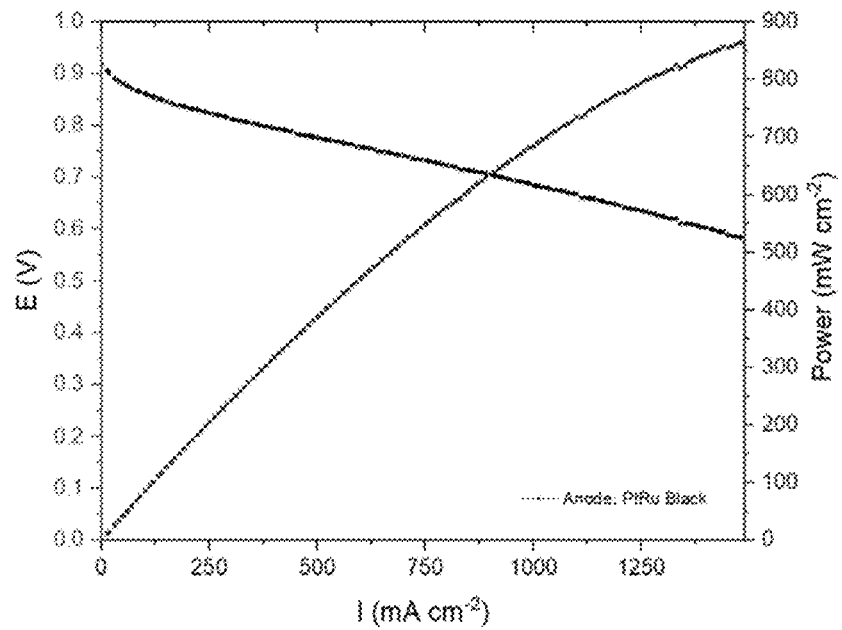
FIG. 2 is a graph showing run 9 performance of I-V and I-P curves.

The main fuel cell test results are summarized in Table 1, and the I-V curve of the best fuel cells is shown in FIG. 2.

TABLE 1

Performances of Several Typical DCBFCs

| | Anode | Cathode | Membrane | PPD (mW cm$^{-2}$) | OCV (before) | OCV (after) |
|---|---|---|---|---|---|---|
| Base* | Pt Black | Pt/C-40 wt % | A201 | 150 | — | −0.854 |
| Run 4 | Pt Black | Pt/C 40 wt % | A201 | 402.5 | 0.891 | 0.928 V |
| Run 6 | Pt/C 40 wt % | Pt/C 40 wt % | A201 | 492.5 | 0.872 | 0.924 V |
| Run 11 | PtRu/C 40 wt % | Pt/C 40 wt % | A201 | 585.4 | 0.922 | 0.930 V |
| Run 9 | PtRu Black | Pt/C 40 wt % | A201 | 865.2 | 0.913 | 0.922 V |

*The base case: Carbohydrazide fuel was not heated at 80° C., and anode Pt loading was 3.0 mg/cm$^2$.

It was found that carbohydrazide fuel needs to be pre-activated above a "threshold temperature." In the experiment, the carbohydrazide fuel was preheated at 80° C. The peak power density was found to increase greatly, say from 150 mW/cm$^2$ to 402 mW/cm$^2$.

Figure 3:
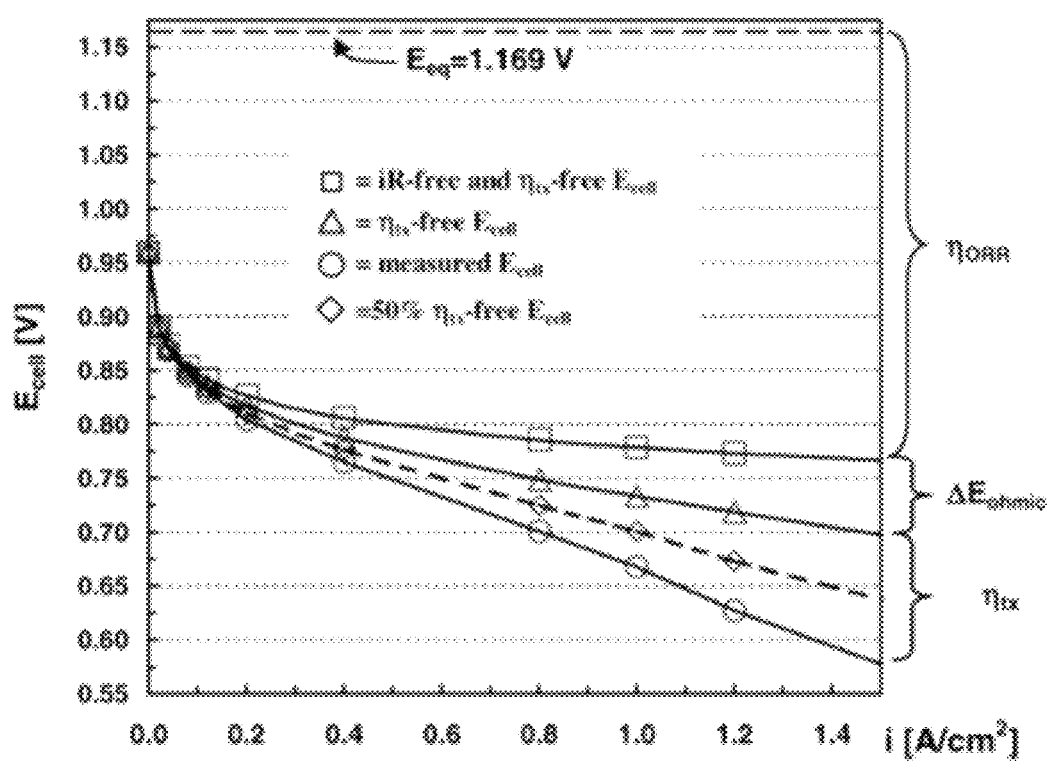
FIG. 3 is a graph showing a benchmark $H_2$ fuel cell performance. Circular symbols: 50 $cm^2$ single-cell $H_2$/air performance at $T_{cell}$=80° C. dew points, i.e., 100% RH) at a total pressure of 150 $kPa_{abs}$ and stoichiometric flows of s=2.0/2.0 (controlled stoichiometric flows for i≥A/$cm^2$). Catalyst-coated membrane (CCM) based on a ca. 25-μm low-EW membrane (ca. 900 EW) coated with electrodes consisting of ca. 50 wt. % Pt/carbon (0.4/0.4 $mg_{Pt}$/$cm^2$ (anode/cathode)) and a low-EW ionomer (ca. 900 EW; ionomer/carbon ratio=0.8/1). Square symbols: $E_{cell}$ vs. i for the mass-transport-free and ohmically corrected (i.e., iR-free)$E_{cell}$/i-curve shown with the circular symbols. In situ measurements of the high frequency resistance vs. current density were obtained at 1 kHz (ranging from 45 to 55 mΩ $cm^2$) and used for the ohmic correction. Triangular symbols: Addition of the ohmic losses, $\Delta E_{ohmic}$, to the polarization curve shown with the square symbols. Diamond symbols: $E_{cell}$/i-curve shown with the circular symbols corrected for 50% of the mass-transport losses.

PtRu was found to be a better anode catalyst for carbohydrazide oxidation in alkaline electrolyte compared with Pt, and the peak power density of a DCBFC can be increased by 19% when Pt/C was replaced by a PtRu/C as the anode catalyst. The fuel cell performance was further improved by using PtRu black anode catalyst by about 48% (from 585 mW/cm$^2$ to 865 mW/cm$^2$, the highest known peak power density for direct liquid fuel cells), indicating the anode structure is critical to improve the fuel cell peak power density. It is noted that the DCBFC also beats a benchmark H$_2$ fuel cell, in high operation voltage, e.g., at 0.8 V, current density is 375 mW/cm$^2$ vs ~250 mW/cm$^2$ (see FIG. 3).

The performance of the DCBFC is very stable. There is no noticeable performance degradation when the current scanning to collect I-V curves was repeated.

The carbohydrazide fuel was also replaced by an aqueous ammonia solution (2.0 M Urea+6.0 M KOH, preheated at 90° C.) to obtain a peak power density of 49.5 mW/cm$^2$. In comparison, the fuel cell with urea solution as fuel did not generate stable electrical energy.

A comparison of carbohydrazide with reported fuels for direct liquid fuel cells is shown in Table 2.

TABLE 2

Comparison of Carbohydrazide with Reported Fuels for Direct Liquid Fuel Cells

| Fuel | Standard voltage (V) | Toxicity-LD$_{50}$ oral rat, (mg/kg) | Price ($/ton) | Energy density (kWh/L) | Catalyst (metal loading, mg/cm$^2$) Anode | Peak power density (mW/cm$^2$) Cathode | Fuel |
|---|---|---|---|---|---|---|---|
| Carbohydrazide | 1.65 | >5,000 | 1,000 | 4.26$^a$ | PtRu (2.25) | Pt/C (1.0) | 865 |
| Borohydride | 1.64 | 160 | 10,000 | 3.00 (30 wt %) | Pt—Ni (1.0) | Pt (1.0) | 250 |
| Hydrazine | 1.56 | 60 | 2,500 | 3.50 | Ni—Zn (2.0) | Fe-based (3.0) | 450 |
| Formic acid | 1.48 | 1100 | 1200 | 2.10 | Pd—Pt (5.0) | Pt (5.0) | 300 |
| Methanol | 1.25 | >5,000 | 500 | 4.67 | PtRu (2.0) | Pt (2.0) | 250 |
| Glycerol | 1.24 | >5,000 | 1,000 | 6.70 (5.74$^b$) | PdAg (0.5) | Fe-based (3.0) | 265 |
| Ethylene glycol | 1.22 | 4,700 | 1,100 | 5.91 (4.72$^c$) | PdAg (0.5) | Fe-based (3.0) | 240 |
| Dimethyl ether | 1.18 | >5,000 | 800 | 8.20 | PtRu (6.0) | Pt (4.0) | 120 |
| Ammonia | 1.17 | 350 | 500 | 4.32 | Ni (bulk) | NiO (bulk) | 40 (250° C.) |
| Ethanol | 1.15 | >5,000 | 1,000 | 6.30 (2.10$^d$) | PdAg (0.5) | Fe-based (3.0) | 200 |

$^a$Under ambient conditions, carbohydrazide is a solid, but it is completely miscible with water.
$^b$When forming oxalic acid (and carbon dioxide).
$^c$When forming oxalic acid.
$^d$When forming acetic acid.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A method of generating energy, said method comprising:
   providing a fuel cell comprising:
      anode and cathode electrodes;
      a separator positioned between the anode and cathode electrodes; and
      anode and cathode catalysts, wherein the anode catalyst comprises (i) a low-loading of platinum group metals (PGMs) supported on a Group 4-6 transition metal carbide (TMC) or nitride (TMN); (ii) an alloy or physical mixture comprising a Group 10 transition metal selected from Pt, Pd, and Ni and one or more of the following elements: Pt, Pd, Ni, Ir, Rh, Ru, Fe, Re, Sn, W, Mo, Ta, and Nb; or (iii) mixtures thereof; and
   adding to the fuel cell a liquid anode fuel to generate energy from the liquid anode fuel, wherein the liquid anode fuel comprises one or more hydrazide compounds.

2. The method of claim 1, wherein the anode fuel is preheated to 60-80° C. before said adding.

3. The method of claim 1, wherein the separator is an anion exchange membrane.

4. The method of claim 1, wherein the anode catalyst comprises a low-loading of platinum group metals (PGMs) supported on a Group 4-6 transition metal carbide (TMC) or nitride (TMN).

5. The method of claim 1, wherein the anode catalyst comprises an alloy or physical mixture comprising a Group 10 transition metal selected from Pt, Pd, and Ni and one or more of the following elements: Pt, Pd, Ni, Ir, Rh, Ru, Fe, Re, Sn, W, Mo, Ta, and Nb.

6. The method of claim 1, wherein the anode catalyst comprises a mixture of (i) a low-loading of platinum group metals (PGMs) supported on a Group 4-6 transition metal carbide (TMC) or nitride (TMN) and (ii) an alloy or physical mixture comprising a Group 10 transition metal selected from Pt, Pd, and Ni and one or more of the following elements: Pt, Pd, Ni, Ir, Rh, Ru, Fe, Re, Sn, W, Mo, Ta, and Nb.

7. The method of claim 1, wherein the anode catalyst comprises a metal loading of less than about 5 mg/cm$^2$.

8. The method of claim 1, wherein the anode catalyst comprises a first layer proximate the separator and a second layer proximate the liquid anode fuel added to the fuel cell.

9. The method according to claim 8, wherein the first layer comprises Pt.

10. The method according to claim 9, wherein the first layer comprises a Pt loading of about 0.1 to 2.0 mg/cm$^2$.

11. The method according to claim 8, wherein the second layer comprises PtRu.

12. The method according to claim 11, wherein the second layer comprises a PtRu metal loading of about 0.1 to 3.0 mg/cm$^2$.

13. The method of claim 1, wherein the cathode catalyst is selected from a low-loading metal, a metal-free catalyst, doped carbon material, noble metal, non-noble metal, or mixtures thereof.

14. The method of claim 13, wherein the cathode catalyst comprises Pt/C, Pd/C, Ag/C, or Fe-N/C.

15. The method of claim 1, wherein the anode fuel is selected from formic hydrazide, carbohydrazide, 1,2-diformylhydrazine, acethydrazide, methyl hydrazinocarboxylate, oxalyldihydrazide, cyanoacetohydrazide, propanoic acid hydrazide, 1,2-diacetylhydrazine, succinic dihydrazide, ethyl 3-hydrazino-3-oxopropionate, adipic acid dihydrazide, 3-bromobenzoic hydrazide, 4-bromobenzoic hydrazide, 2-chlorobenzoic hydrazide, 4-chlorobenzhydrazide, 2-fluorobenzoic hydrazide, 3-fluorobenzoic hydrazide, 4-fluorobenzoic hydrazide, 4-nitrobenzoic hydrazide, benzhydrazide, 3-hydroxybenzoic hydrazide, 2,4-dihydroxybenzoic acid hydrazide, 2-aminobenzhydrazide, 4-aminobenzoic hydrazide, 3,4-diaminobenzhydrazide, 3-nitrophthalhydrazide, N-aminophthalimide, phthalhydrazide, 4-(trifluoromethyl)benzhydrazide, 4-fluorophenoxyacetic acid hydrazide, 3-methyl-4-nitrobenzhydrazide, p-toluic hydrazide, phenylacetic hydrazide, 4-methoxybenzhydrazide, m-anisic hydrazide, octanoic hydrazide, 4-methoxybenzyl carbazate, di-tert-butyl hydrazodiformate, 3-hydroxy-2-naphthoic hydrazide, 4-tert-butylbenzoic hydrazide, 1,5-diphenylcarbazide, 1,5-diphenylcarbazide, and mixtures thereof.

16. The method of claim 1, wherein the anode fuel comprises formic hydrazide or carbohydrazide.

17. The method of claim 1, wherein the fuel cell is at a temperature of about 60° C. to about 80° C. at the time of said adding.

18. A fuel cell comprising:
   an anode electrode;
   a cathode electrode;
   an anion exchange membrane positioned between the anode electrode and the cathode electrode;
   an anode catalyst, wherein the anode catalyst comprises (i) a low-loading of platinum group metals (PGMs) supported on a Group 4-6 transition metal carbide (TMC); (ii) carbon black and an alloy or physical mixture comprising a Group 10 transition metal selected from Pt, Pd, and Ni and one or more of the following elements: Pt, Pd, Ni, Ir, Rh, Ru, Fe, Re, Sn, W, Mo, Ta, and Nb; or (iii) mixtures thereof; and
   a cathode catalyst.

19. The fuel cell of claim 18, wherein the anode catalyst comprises a metal loading of less than about 5 mg/cm$^2$.

20. The method of claim 1, wherein the anode catalyst comprises a first layer proximate the separator and a second layer proximate the liquid anode fuel added to the fuel cell, wherein the first layer comprises Pt comprising a metal loading of less than about 5 mg/cm$^1$ and the second layer comprises a PtRu metal loading of about 0.1 to 3.0 mg/cm$^2$.

* * * * *